(12) United States Patent
Somanath et al.

(10) Patent No.: US 7,677,047 B2
(45) Date of Patent: Mar. 16, 2010

(54) INVERTED STIFFENED SHELL PANEL TORQUE TRANSMISSION FOR LOADED STRUTS AND MID-TURBINE FRAMES

(75) Inventors: Nagendra Somanath, Manchester, CT (US); Keshava B. Kumar, South Windsor, CT (US); Joseph James Sedor, Oxford, MA (US)

(73) Assignee: United Technologies Corporation, Hartford, CT (US)

( * ) Notice: Subject to any disclaimer, the term of this patent is extended or adjusted under 35 U.S.C. 154(b) by 699 days.

(21) Appl. No.: 11/392,167

(22) Filed: Mar. 29, 2006

(65) Prior Publication Data

US 2007/0237635 A1 Oct. 11, 2007

(51) Int. Cl.
*F02C 7/20* (2006.01)
(52) U.S. Cl. ................ 60/796; 415/142; 415/213.1
(58) Field of Classification Search ............ 60/796, 60/797, 805; 415/142, 229, 213.1, 191, 208.2, 415/209.2, 209.4, 210.1
See application file for complete search history.

(56) References Cited

U.S. PATENT DOCUMENTS

| 4,428,713 | A | * | 1/1984 | Coplin et al. ............ 415/48 |
| 4,920,742 | A | * | 5/1990 | Nash et al. ............. 60/799 |
| 5,307,622 | A | * | 5/1994 | Ciokajlo et al. ........ 60/39.162 |
| 6,708,482 | B2 | | 3/2004 | Seda | |
| 6,883,303 | B1 | | 4/2005 | Seda | |

* cited by examiner

*Primary Examiner*—Michael Cuff
*Assistant Examiner*—Andrew Nguyen
(74) *Attorney, Agent, or Firm*—Kinney & Lange, P.A.

(57) ABSTRACT

A mid-turbine frame connected to at least one mount of a gas turbine engine transfers a first load from a first bearing and a second load from a second bearing to the mount. The mid-turbine frame includes a plurality of inverted panels and a plurality of struts. The inverted panels convert the first and second loads to a shear flow. The struts are connected to the inverted panels and transfer the shear flow to the mount.

2 Claims, 4 Drawing Sheets

INVERTED STIFFENED SHELL PANEL TORQUE TRANSMISSION FOR LOADED STRUTS AND MID-TURBINE FRAMES

BACKGROUND OF THE INVENTION

The present invention generally relates to the field of gas turbine engines. In particular, the invention relates to a mid-turbine frame for a jet turbine engine.

Turbofans are a type of gas turbine engine commonly used in aircraft, such as jets. The turbofan generally includes a high and a low pressure compressor, a high and a low pressure turbine, a high pressure rotatable shaft, a low pressure rotatable shaft, a fan, and a combuster. The high-pressure compressor (HPC) is connected to the high pressure turbine (HPT) by the high pressure rotatable shaft, together acting as a high pressure system. Likewise, the low pressure compressor (LPC) is connected to the low pressure turbine (LPT) by the low pressure rotatable shaft, together acting as a low pressure system. The low pressure rotatable shaft is housed within the high pressure shaft and is connected to the fan such that the HPC, HPT, LPC, LPT, and high and low pressure shafts are coaxially aligned.

Outside air is drawn into the jet turbine engine by the fan and the HPC, which increases the pressure of the air drawn into the system. The high-pressure air then enters the combuster, which burns fuel and emits the exhaust gases. The HPT directly drives the HPC using the fuel by rotating the high pressure shaft. The LPT uses the exhaust generated in the combuster to turn the low pressure shaft, which powers the fan to continually bring air into the system. The air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to a mid-turbine frame located between the HPT and the LPT by bearing support structures, for example, bearing cones. The mid-turbine frame acts to distribute the load on the bearing support structures by transferring the load from the bearing support structures to the engine casing. Decreasing the weight of the mid-turbine frame can significantly increase the efficiency of the jet turbine engine and the jet itself.

BRIEF SUMMARY OF THE INVENTION

A mid-turbine frame connected to at least one mount of a gas turbine engine transfers a first load from a first bearing and a second load from a second bearing to the mount. The mid-turbine frame includes a plurality of inverted panels and a plurality of struts. The inverted panels convert the first and second loads to a shear flow. The struts are connected to the inverted panels and transfer the shear flow to the mount.

DETAILED DESCRIPTION

Figure 1:
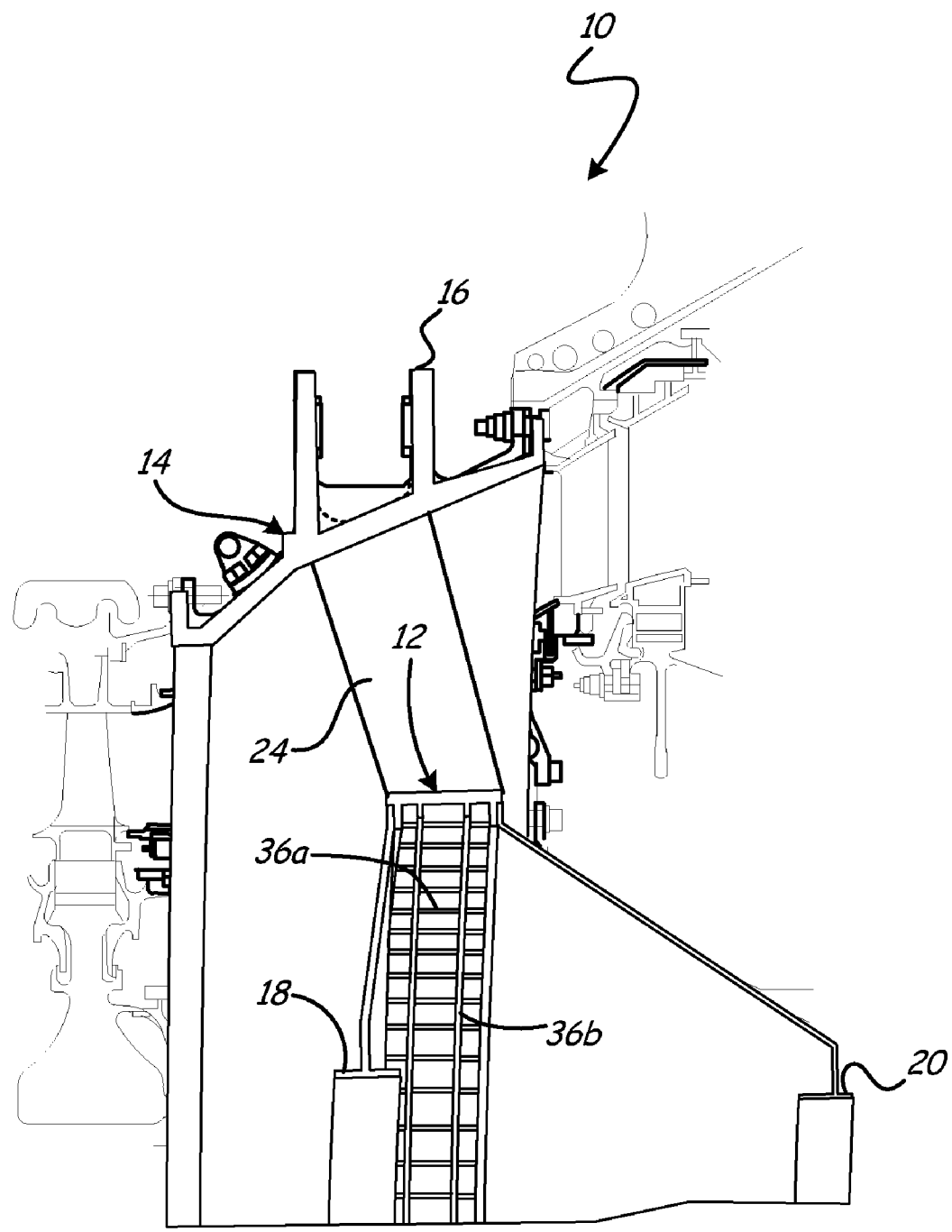
FIG. 1 is a partial sectional view of an intermediate portion of a gas turbine engine.

FIG. 1 shows a partial sectional view of an intermediate portion of gas turbine engine 10 about a gas turbine engine axis centerline. Gas turbine engine 10 generally includes mid-turbine frame 12, engine casing 14, mounts 16, first bearing 18, and second bearing 20. Mid-turbine frame 12 of gas turbine engine 10 has a lightweight design that efficiently transfers loads from first and second bearings 18 and 20 to engine casing 14 and mounts 16.

Mid-turbine frame 12 is housed within engine casing 14 of gas turbine engine 10. Mid-turbine frame 12 is connected to engine casing 14 and first and second bearings 18 and 20. Engine casing 14 protects mid-turbine frame 12 from its surroundings and transfers the loads from mid-turbine frame 12 to mounts 16. Mid-turbine frame 12 converts the loads from first and second bearings 18 and 20 into a one-directional shear flow. The one-directional shear flow is subsequently transferred to engine casing 14 and mounts 16. The structure of mid-turbine frame 12 does not require a torque box, making mid-turbine frame 12 lightweight and easy to manufacture. The weight of mid-turbine frame 12 will depend on the material used to form mid-turbine frame 12. In one embodiment, mid-turbine frame 12 weighs less than approximately 200 pounds. For example, mid-turbine frame 12 formed of a Nickel-based alloy has a weight of approximately 160 pounds.

First and second bearings 18 and 20 are located at forward and aft ends of gas turbine engine 10, respectively, below mid-turbine frame 12. First and second bearings 18 and 20 support thrust loads, vertical tension, side gyroscopic loads, as well as vibratory loads from high and low pressure rotors located in gas turbine engine 10. All of the loads supported by first and second bearings 18 and 20 are transferred to engine casing 14 and mounts 16 through mid-turbine frame 12. Second bearing 20 is typically designed to support a greater load than first bearing 18, so mid-turbine frame 12 is designed for stiffness and structural feasibility assuming that second bearing 20 is the extreme situation.

Figure 2:
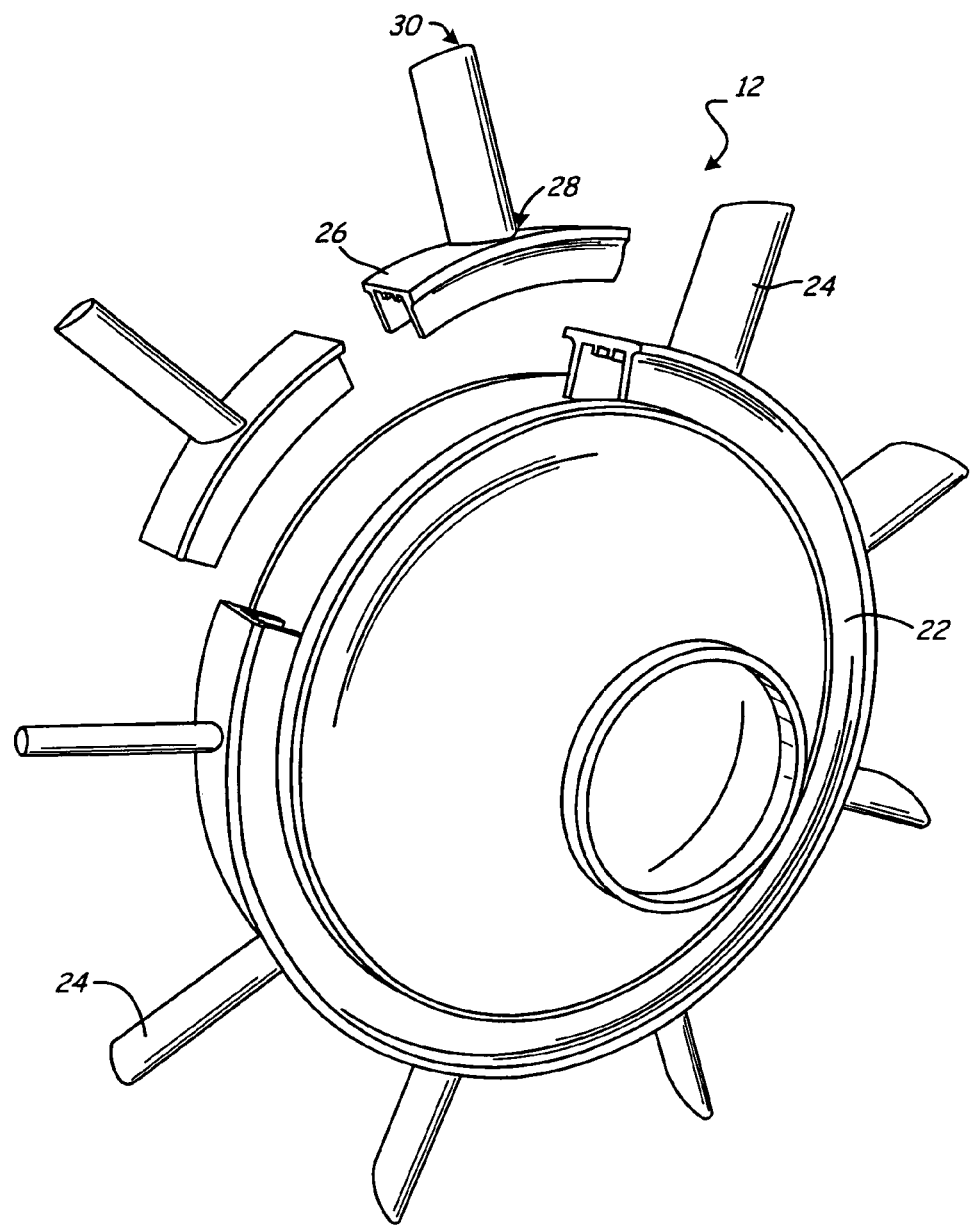
FIG. 2 is an enlarged perspective view of a mid-turbine frame.

FIG. 2 shows an enlarged, perspective view of mid-turbine frame 12. Mid-turbine frame 12 includes segmented ring structure 22 and a plurality of struts 24 extending from along the circumference of ring structure 24. Struts 24 connect mid-turbine frame 12 to first and second bearings 18 and 20 (shown in FIG. 1). Ring structure 22 of mid-turbine frame 12 is formed from a plurality of inverted panels 26 that are connected to struts 24. Each segment of mid-turbine frame 12 includes a strut 26 and an inverted panel 26. Struts 24 are spaced apart along ring structure 22, with each strut 24 connected to an inverted panel 26. In one embodiment, inverted panels 26 are inverted stiffened shell panels.

Struts 24 of mid-turbine frame 12 transfer the loads from first and second bearings 18 and 20 that enter through ring structure 22 to engine casing 14. Each of struts 24 has a first end 28 connected to ring structure 22 and a second end 30 connected to engine casing 14 (shown in FIG. 1). The loads travel from ring structure 22 through struts 24 to engine casing 14. In one embodiment, struts 24 have an elliptical shape and are sized to take a load and transfer it in a vertical direction toward engine casing 14. In one embodiment, nine struts are positioned approximately forty degrees apart from one another along the circumference of mid-turbine frame 12.

In another embodiment, twelve total struts are positioned approximately thirty degrees apart from one another along the circumference of mid-turbine frame 12.

Figure 3:
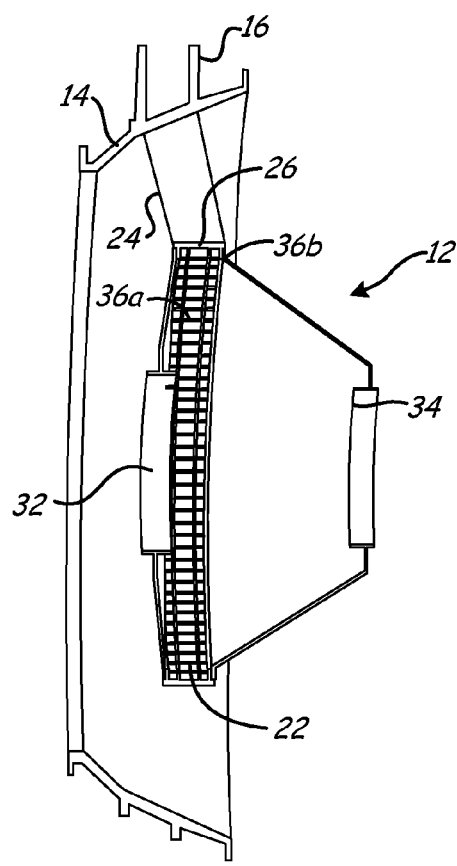
FIG. 3 is a cross-sectional perspective view of the mid-turbine frame.
Figure 4:
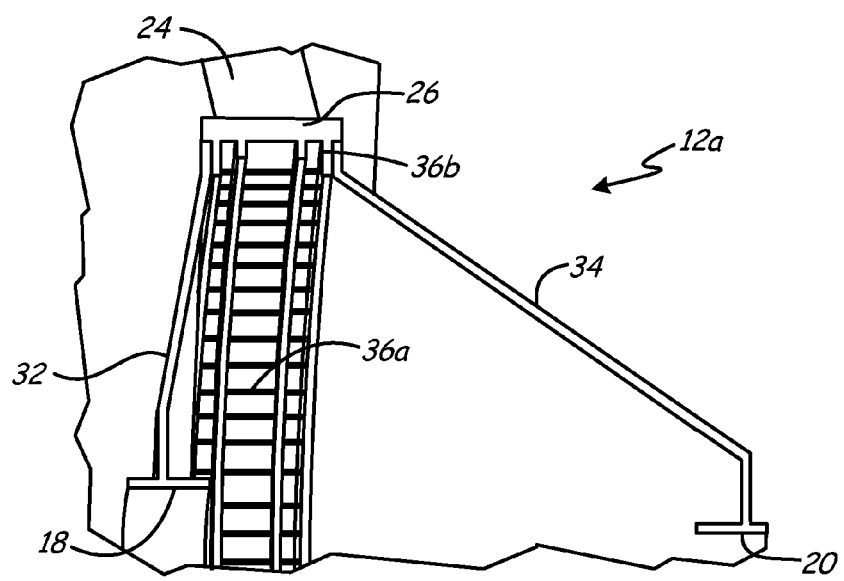
FIG. 4 is a cross-sectional perspective view of a segment of the mid-turbine frame.

FIG. 3 shows a cross-sectional view of mid-turbine frame 12. First and second bearings 18 and 20 (shown in FIG. 1) are connected to mid-turbine frame 12 by first and second bearing cones 32 and 34, respectively. First and second bearings cones 32 and 34 are continuously rotating with high and low pressure rotors and transfer the loads from first and second bearings 18 and 20 in the form of shear forces to mid-turbine frame 12. As can be seen in FIG. 4, first bearing cone 32 is connected to one side of mid-turbine frame 12 and second bearing cone 34 is connected to the opposite side of mid-turbine frame 12.

FIG. 4 shows a cross-sectional perspective view of a segment of mid-turbine frame 12a. For ease of discussion, FIG. 4 will be discussed in reference to one segment of mid-turbine frame 12a. However, all of the segments of mid-turbine frame 12 function in the same manner. Inverted panel 26 of mid-turbine frame 12 includes a plurality of compression ring stiffeners 36 that direct the shear forces from first and second bearing cones 32 and 34 in a radial direction using radial stiffeners 36a (shown in FIG. 5) and in a circumferential direction using circumferential stiffeners 36b. Ring stiffeners 36 extend from inverted panel 26 in a direction opposite strut 24 connected to inverted panel 26 and perpendicular to a centerline axis of gas turbine engine 10 (shown in FIG. 1). Together, radial and circumferential ring stiffeners 36a and 36b form a plurality of closed structures that direct a shear flow resulting from the shear forces of first and second bearing cones 32 and 34 in one direction, toward struts 24.

Figure 5:
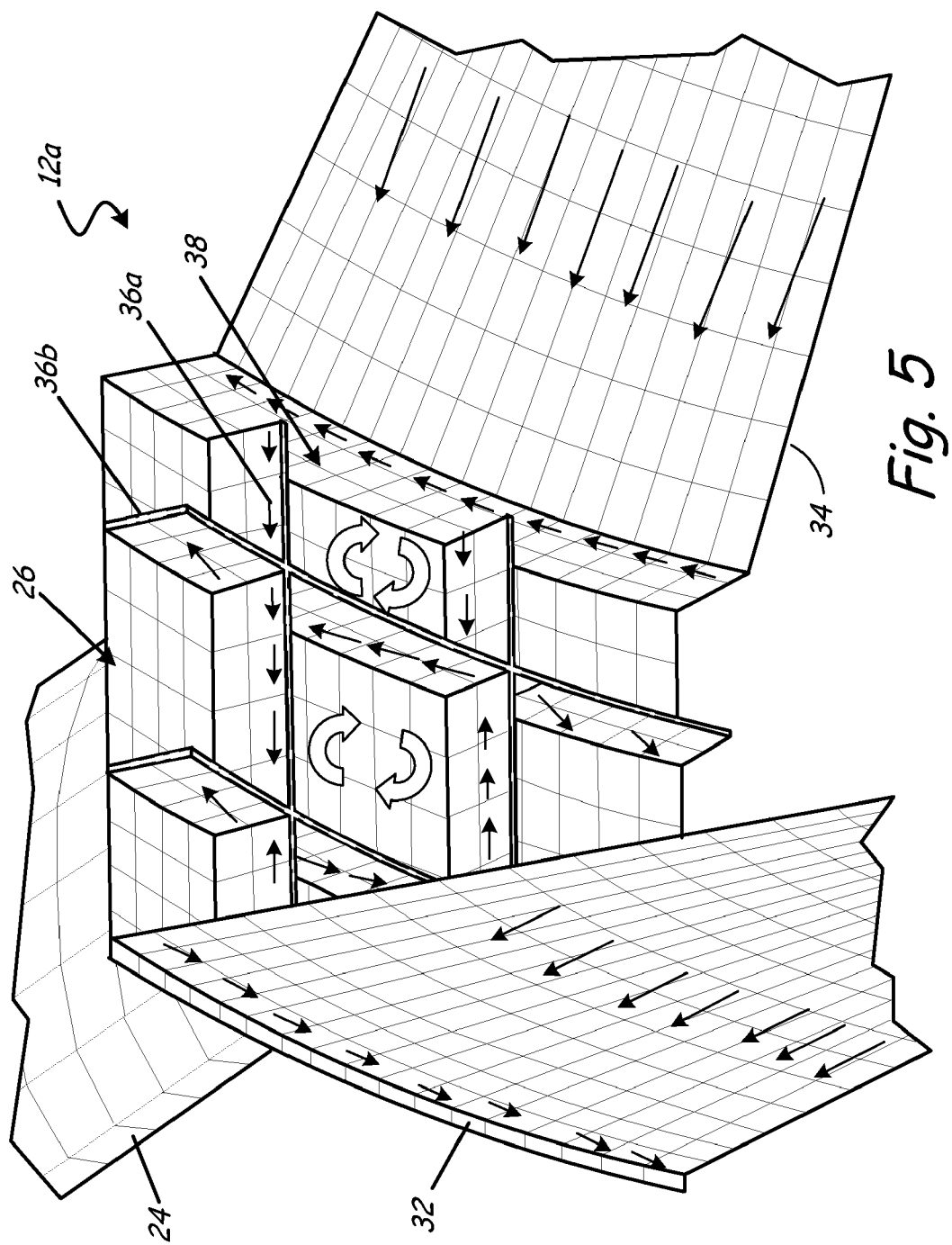
FIG. 5 is a perspective view of an inverted stiffened panel of the mid-turbine frame.

FIG. 5 shows a perspective view of an inverted panel 26 with the directional flow of the loads, or shear forces, entering inverted panel 26. As with FIG. 4, although FIG. 5 will be discussed in reference to only one segment of mid-turbine frame 12a, all segments of mid-turbine frame 12 function in the same manner. The loads from first and second bearings 18 and 20 (shown in FIG. 1) enter first and second bearing cones 32 and 34 as shear forces in the rotational direction along the circumference of first and second bearing cones 32 and 34 and in the radial direction along the length of first and second bearing cones 32 and 34. Due to the nature of the torques, the shear forces coming from first bearing 18 flow through first bearing cone 32 in one direction (counterclockwise), while the shear forces coming from second bearing 20 flow through second bearing cone 34 in the opposite (clockwise) direction.

Radial and circumferential stiffeners 36a and 36b of inverted panel 26 break up the shear forces passing through first and second bearing cones 32 and 34 into smaller components. The shear forces from first and second bearing cones 32 and 34 first interact with radial stiffeners 36a of inverted panel 26 without changing direction. As they flow through radial stiffeners 36a to circumferential stiffeners 36b, the shear force components combine and become a shear flow in one direction. Together, radial stiffeners 36a and circumferential stiffeners 36b form a closed structure, or torque cell 38, to cause the multi-directional shear forces to flow in one direction. The resulting one-directional shear flow created by torque cells 38 converts the torque mechanism into an equivalent load in the direction of struts 24.

Each of inverted stiffened shell panels 26 has a plurality of torque cells 38 formed by ring stiffeners 36 that convert the multi-directional shear forces from first and second bearing cones 32 and 34 into a one-directional shear flow. When the shear flows from torque cells 38 of inverted panel 26 are added together, there is a total equivalent load that is in the direction of strut 24. Torque cells 38 of inverted panel 26 thus allow a mid-turbine frame design that does not require a torque box, reducing the overall weight of mid-turbine frame 12. Each torque cell 38 of each inverted panel 26 is perpendicular to strut 24, also providing vertical load transfer. The segmented structure of mid-turbine frame 12 allows load transfer at particular locations, rather than along the entire circumference of mid-turbine frame 12. The segmented nature of mid-turbine frame 12 thus also reduces the overall weight of mid-turbine frame 12.

The mid-turbine frame has a segmented, lightweight design that includes a ring structure and a plurality of struts. The ring structure is made up of a plurality of inverted stiffened shell panels with radial and circumferential stiffeners extending perpendicular to the inverted stiffened shell panel. In combination, the radial and circumferential stiffeners form a plurality of torque cells. The torque cells convert the loads from a pair of bearings into smaller components to form a one-directional shear flow. The shear flow is transferred to a plurality of struts of the mid-turbine frame, which subsequently transfer the load to an engine case surrounding the mid-turbine frame and mounts of the gas turbine engine.

Although the present invention has been described with reference to preferred embodiments, workers skilled in the art will recognize that changes may be made in form and detail without departing from the spirit and scope of the invention.

The invention claimed is:

1. A mid-turbine frame assembly connected to at least one mount of a gas turbine engine for transferring a first load from a first bearing and a second load from a second bearing to the mount, the mid-turbine frame assembly comprising:

a plurality of inverted panels positioned perpendicular to an axis of the gas turbine engine and that convert the first and second loads to a one-directional shear flow, wherein each inverted panel comprises:

a plurality of radial stiffeners that direct the loads in a radial direction within the inverted panel; and a plurality of circumferential stiffeners that direct the loads in a circumferential direction within the inverted panel, wherein the plurality of radial stiffeners and the plurality of circumferential stiffeners form a plurality of torque cells and wherein the first and second loads are converted to the one-directional shear flow at the plurality of torque cells, wherein the plurality of torque cells have at least a three-by-three configuration;

a first bearing cone connected between the first bearing and the inverted panels, wherein the first load is transferred to the inverted panels through the first bearing cone;

a second bearing cone connected between the second bearing and the inverted panels, wherein the second load is transferred to the inverted panels through the second bearing cone; and a plurality of struts connected to the inverted panels that transfer the one-directional shear flow to the mount.

2. The mid-turbine frame assembly of claim 1, wherein the inverted panels form a segmented ring.

* * * * *